(12) United States Patent
Baryshnikov et al.

(10) Patent No.: US 7,527,481 B2
(45) Date of Patent: May 5, 2009

(54) EJECTOR PUMP FOR A FUEL SYSTEM FOR A GAS TURBINE ENGINE

(75) Inventors: Dmitriy Baryshnikov, South Beloit, IL (US); Douglas P. Smith, Roscoe, IL (US)

(73) Assignee: Woodward Governor Company, Fort Collins, CO (US)

( * ) Notice: Subject to any disclaimer, the term of this patent is extended or adjusted under 35 U.S.C. 154(b) by 517 days.

(21) Appl. No.: 11/194,814

(22) Filed: Aug. 1, 2005

(65) Prior Publication Data

US 2007/0017206 A1 Jan. 25, 2007

Related U.S. Application Data

(62) Division of application No. 10/461,205, filed on Jun. 13, 2003, now Pat. No. 7,007,452.

(51) Int. Cl.
*F04F 5/48* (2006.01)
(52) U.S. Cl. ............... 417/183; 417/184; 417/190; 417/191
(58) Field of Classification Search ............ 417/183, 417/184, 190, 191
See application file for complete search history.

(56) References Cited

U.S. PATENT DOCUMENTS

| | | | |
|---|---|---|---|
| 409,046 A * | 8/1889 | Lange | ............... 417/183 |
| 2,746,250 A * | 5/1956 | Hawkins | ............... 417/184 |
| 3,810,714 A | 5/1974 | Turner | |
| 3,901,025 A | 8/1975 | Bryerton et al. | |
| 3,922,113 A * | 11/1975 | Turner | ............... 417/184 |
| 4,066,386 A | 1/1978 | Johnson et al. | |
| 5,896,737 A | 4/1999 | Dyer | |
| 6,442,925 B1 | 9/2002 | Dalton et al. | |

* cited by examiner

*Primary Examiner*—Devon C Kramer
*Assistant Examiner*—Christopher Bobish
(74) *Attorney, Agent, or Firm*—Reinhart Boerner Van Deuren P.C.

(57) ABSTRACT

A system for automatically transferring the fuel from one or more engine fuel manifolds directly to the engine fuel tank(s) during engine shutdown using an ejector pump has been presented. A checkvalve, which may be integrated with the ejector pump, is also used. A metering valve initiates fuel flow shutoff and is used in the draining of the fuel manifolds, thereby eliminating the need for an additional solenoid dedicated mainly to the shutoff function. The shutoff and pressurizing valve provides flow division between manifolds and manifold drain for systems having multiple manifolds. The bypass valve is used to turn the motive flow and/or manifold drain functions on and off as a function of engine speed at start and shutdown.

18 Claims, 15 Drawing Sheets

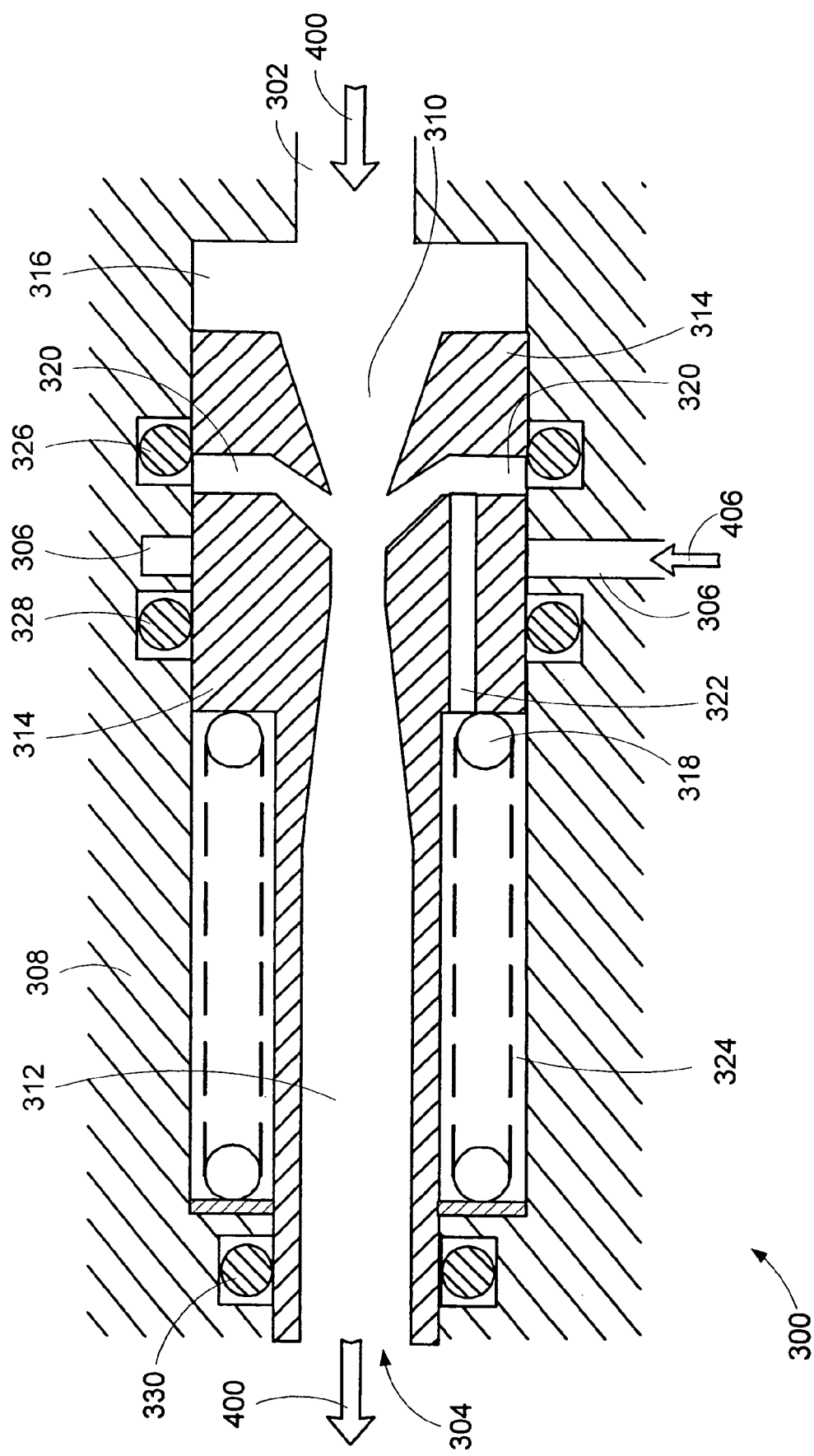

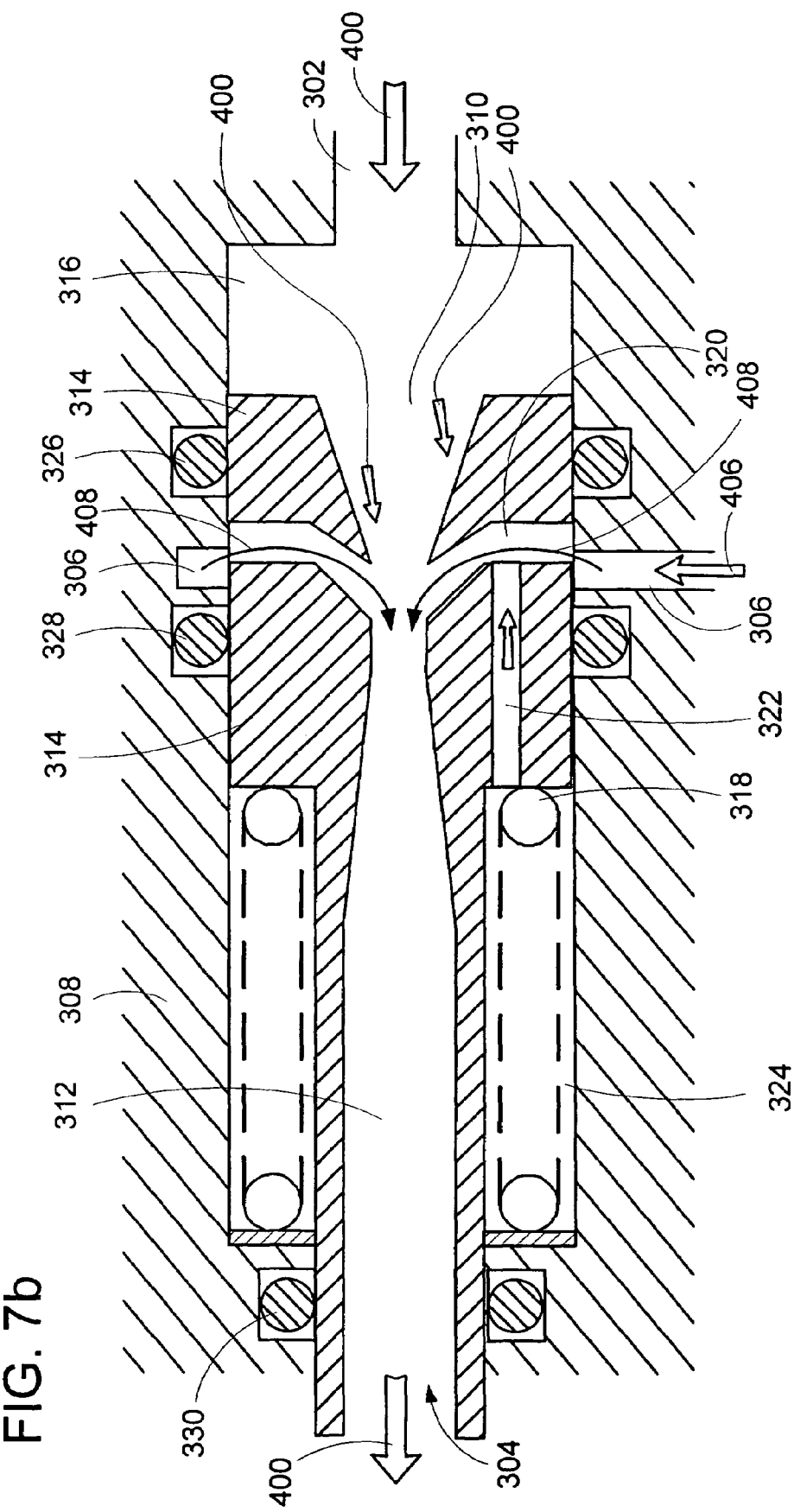

EJECTOR PUMP FOR A FUEL SYSTEM FOR A GAS TURBINE ENGINE

CROSS-REFERENCE TO RELATED PATENT APPLICATIONS

This patent application is a divisional of U.S. patent application Ser. No. 10/461,205, filed Jun. 13, 2003.

FIELD OF THE INVENTION

This invention pertains to gas turbine engines, and more particularly to a system for transferring fuel from the engine manifolds of a gas turbine engine at engine shut down.

BACKGROUND OF THE INVENTION

In many gas turbine engines, the fuel system for regulating the flow of fuel to the combustion chamber consists of one or more fuel nozzles arranged in the combustion chamber, a fuel pump for pressurizing fuel from the fuel supply, a fuel metering unit for controlling the flow of fuel to the fuel nozzles and one or more fuel manifolds fluidically connecting the fuel metering unit to the fuel nozzles.

During engine start-up, fuel is pumped from the fuel supply to the fuel metering unit by the fuel pump and, once a sufficient start-up pressure is attained, the pressurizing valve of the fuel metering unit opens and fuel is supplied to the fuel nozzles via the fuel manifold. Thereafter, the metering valve of the fuel metering unit modulates the rate of fuel flow from the fuel supply to the nozzles. As such, a single, continuous flow path exists from the fuel metering unit, through the fuel manifold, to the fuel nozzles.

When the engine is shutdown, residual fuel may remain in the engine manifold. It is desirable to prevent the residual fuel from remaining in the engine manifold to prevent coking of the residual fuel. Coking of the residual fuel is a fire hazard and can lead to blockages in engine fuel injectors, which results in shorter injector life and can harm engine performance.

It is known in the art to drain residual fuel from the manifold of an engine, downstream of the engine shutoff valve, to prevent the fuel from coking. U.S. Pat. No. 6,442,925 to Dalton et al. discloses a system for draining residual fuel from the engine manifold of a gas turbine. The system includes an ejector having an inlet port for receiving high pressure fuel from a main fuel pump at engine shut-down, an outlet port and a suction port. The ejector defines a nozzle that extends between the inlet port and the outlet port for increasing the velocity of high pressure fuel flowing therethrough at engine shut-down so as to create suction at the suction port. A motive valve controls the flow of high pressure fuel between the main fuel pump and the inlet port of the ejector. A drain valve controls the flow of residual fuel between the engine manifold and the suction port of the ejector such that residual fuel is drawn from the engine manifold under suction to the inlet port of the ejector.

While the Dalton patent provides a unique system for pumping the residual fuel from an engine manifold after the engine is shut down, it is a relatively complex system. The motive valve and drain valve require simultaneous operation. The simultaneous operation is controlled by a three-way shutoff solenoid valve that is used to simultaneously control the motive valve and drain valve. These features add to the overall complexity and may decrease the reliability of the system. Accordingly, there is a need for an improved engine manifold drain system which overcomes the deficiencies of prior art systems The invention provides such an improved engine manifold drain system. These and other advantages of the invention, as well as additional inventive features, will be apparent from the description of the invention provided herein.

BRIEF SUMMARY OF THE INVENTION

The invention provides a system for automatically transferring the fuel from one or more engine fuel manifolds directly to the engine fuel tank(s) during engine shutdown using an ejector pump. The ejector pump inlet port is connected to a port of a bypass valve. The high pressure fuel flowing through the ejector pump creates a suction at the suction port, which draws fuel from the engine fuel manifolds and transfers the fuel to the engine fuel tank(s) when the engine fuel manifolds are connected to the suction port.

In one embodiment, the checkvalve is located in the suction line of the system. In a second embodiment, the checkvalve is located in the injector inlet line and is integrated with or becomes part of the ejector pump. The system has an electrohydraulic servovalve that is used as the metering valve and also initiates fuel flow shutoff by closing the metering valve port and switching P2 pressure to Pb. This equalizes the pressure across the two ends of the pressurizing valve, thereby allowing the pressurizing valve spring to close the pressurizing valve. The use of the metering valve to initiate shutoff eliminates the need for an additional solenoid. The closed pressurizing valve ports both manifolds to the suction side of the injector and allows the ejector to suck the fuel out of the manifolds upon shutdown.

A shutoff and pressurizing valve provides flow division between manifolds and manifold drain for systems having multiple manifolds. The bypass valve is used to turn the motive flow and/or manifold drain functions on and off as a function of engine speed at start and shutdown. An electronic engine control controls the fuel metering/shutoff valve and sets the fuel metering valve port area.

The pressurizing and shutoff valve is also used for flow division between manifolds on engines that have more than one manifold and as a valve to open up a flow path from the manifold(s) to the suction port of an ejector pump. The ejector pump is supplied with flow from a port on the bypass valve. This flow is used during engine operation to operate a fuel tank ejector pump in the fuel tank. The checkvalve is located in the suction line or the inlet line of the ejector pump. The checkvalve prevents ejector leakage into the engine manifolds when the engine is shutdown.

Other aspects, objectives and advantages of the invention will become more apparent from the following detailed description when taken in conjunction with the accompanying drawings.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6b is a cross-sectional view of the valve/pump of FIG. 6a;

FIG. 7b is a cross-sectional view of the valve/pump of FIG. 7a;

FIG. 8b is a cross-sectional view of the valve/pump of FIG. 8a;

FIG. 9b is a cross-sectional view of the valve/pump of FIG. 9a;

FIG. 10b is a cross-sectional view of the valve/pump of FIG. 10a.

DETAILED DESCRIPTION OF THE INVENTION

Figure 1:
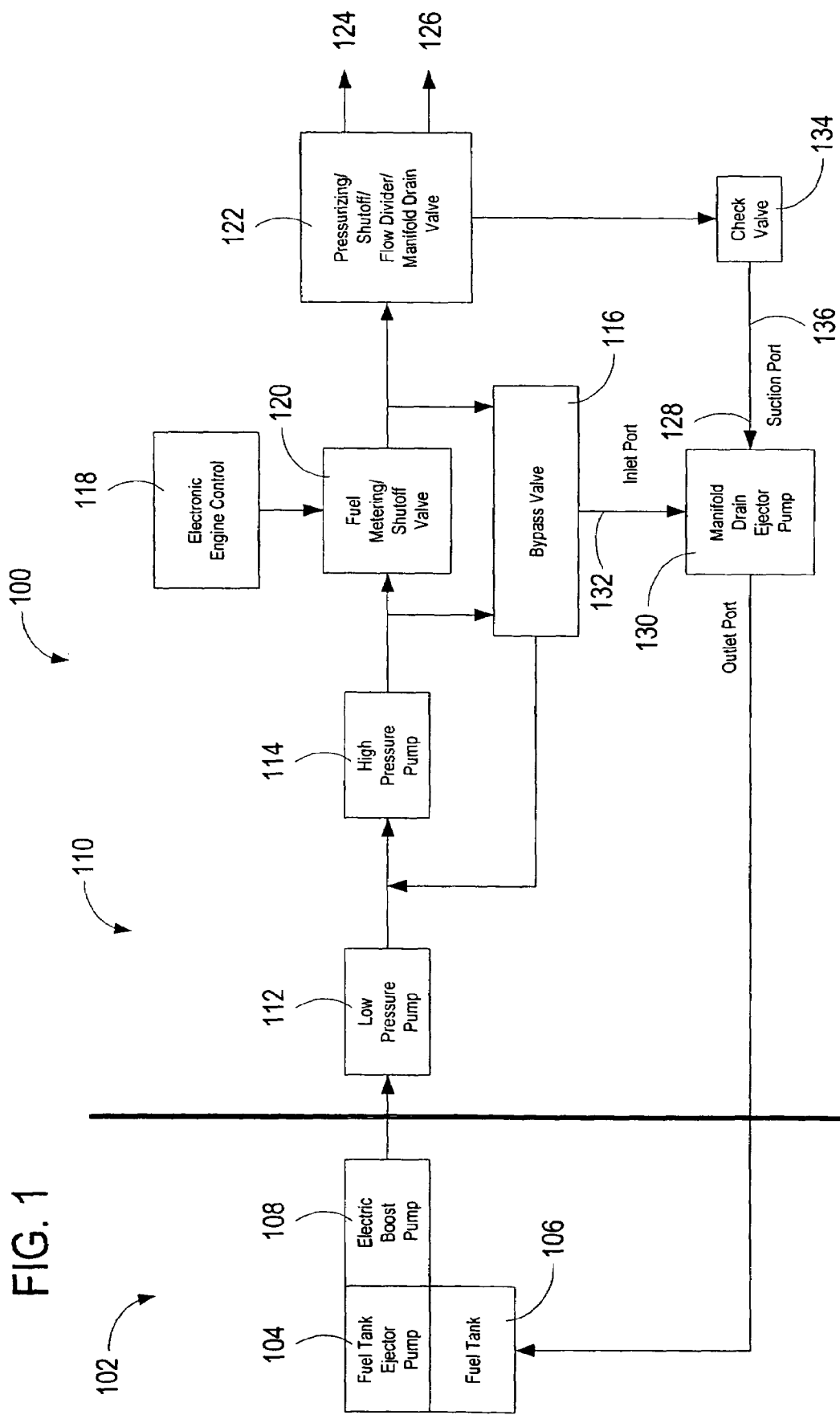
FIG. 1 is a block diagram generally illustrating an exemplary fuel system in which the present invention operates.

The invention provides a system for automatically transferring the fuel from one or more engine fuel manifolds directly to the engine fuel tank(s) during engine shutdown using an ejector pump. The system will be described in relation to an aircraft fuel system. While the system will be described in such a fuel system, it is recognized that the system may be used in other types of gas turbine engine applications. The system requires fewer components than other systems. In addition to the fuel ejector, one additional component is used. This component is a simple, inexpensive checkvalve that may be integrated with the ejector pump. In the system, "motive flow," which is commonly used to supply the fuel tank ejector pump, is also used for the manifold drain ejector pump inlet flow. A metering valve initiates fuel flow shutoff and is used in the draining of the fuel manifolds. This eliminates the need for an additional solenoid dedicated to the shutoff function that is required in prior art systems. The time to drain the manifold(s) upon engine shutdown can be adjusted to prevent hot gases and contamination from entering the fuel control unit. Additionally, the bypass valve may be used to turn the motive flow and/or manifold drain functions on and off as a function of engine speed at start and shutdown.

Turning to the drawings, wherein like reference numerals refer to like elements, the invention is illustrated as being implemented in a suitable operating environment. Although not required, the invention will be described in the general context of an aircraft fuel system. Moreover, those skilled in the art will appreciate that the invention may be practiced with other gas turbine engine configurations.

FIG. 1 illustrates an example of a suitable environment 100 in which the invention operates. FIG. 1 illustrates an example of a suitable environment 100 in which the invention may be implemented. The environment 100 is only one example of a suitable operating environment and is not intended to suggest any limitation as to the scope of use or functionality of the invention. Neither should the environment 100 be interpreted as having any dependency or requirement relating to any one or combination of components illustrated in the exemplary operating environment 100. The gas turbine engine fuel system 110 has a typical arrangement of low pressure centrifugal or regenerative pump 112 supplying fuel to a high pressure pump 114. A boost pump 108 is used in aircraft systems to deliver fuel to pump 112. The high pressure pump 114 is typically a gear pump or vane pump. A pressure regulating valve (i.e., a bypass valve) 116 maintains a relatively constant pressure drop across the metering valve port by bypassing excess flow back to the high pressure pump inlet. The electronic engine control 118 controls the fuel metering/shutoff valve 120 that sets the fuel metering valve port area and fuel flow. Flow to the engine is proportional to the metering valve port area. In the embodiment shown, an electro hydraulic servo valve (EHSV) is used as the metering valve and shutoff valve 120.

In conventional systems, it is typical to have a pressurizing and shutoff valve downstream of the metering valve. In the present invention, however, the pressurizing and shutoff valve 122 is also used for flow division between manifolds 124, 126 on engines that have more than one manifold and as a valve to open up a flow path from the manifold(s) to the suction port 128 of a manifold drain ejector pump 130. The manifold drain ejector pump 130 is supplied with flow from a port 132 on the bypass valve 116. This flow is often called "motive flow" and is used during engine operation to operate an ejector pump 104 in the fuel tank 106. The motive flow to the fuel tank ejector pump 104 becomes available as soon as engine RPM is high enough and adequate pump flow is available for the bypass valve 116 to regulate the pressure drop across the metering valve 120. A checkvalve 134 is located in the suction line 136 of the manifold drain ejector pump 130. Alternatively, the checkvalve is located in the inlet line of the manifold drain ejector pump 130. The checkvalve 134 prevents leakage into the engine manifolds when the engine is shutdown (e.g., sitting overnight on a runway).

Figure 2:
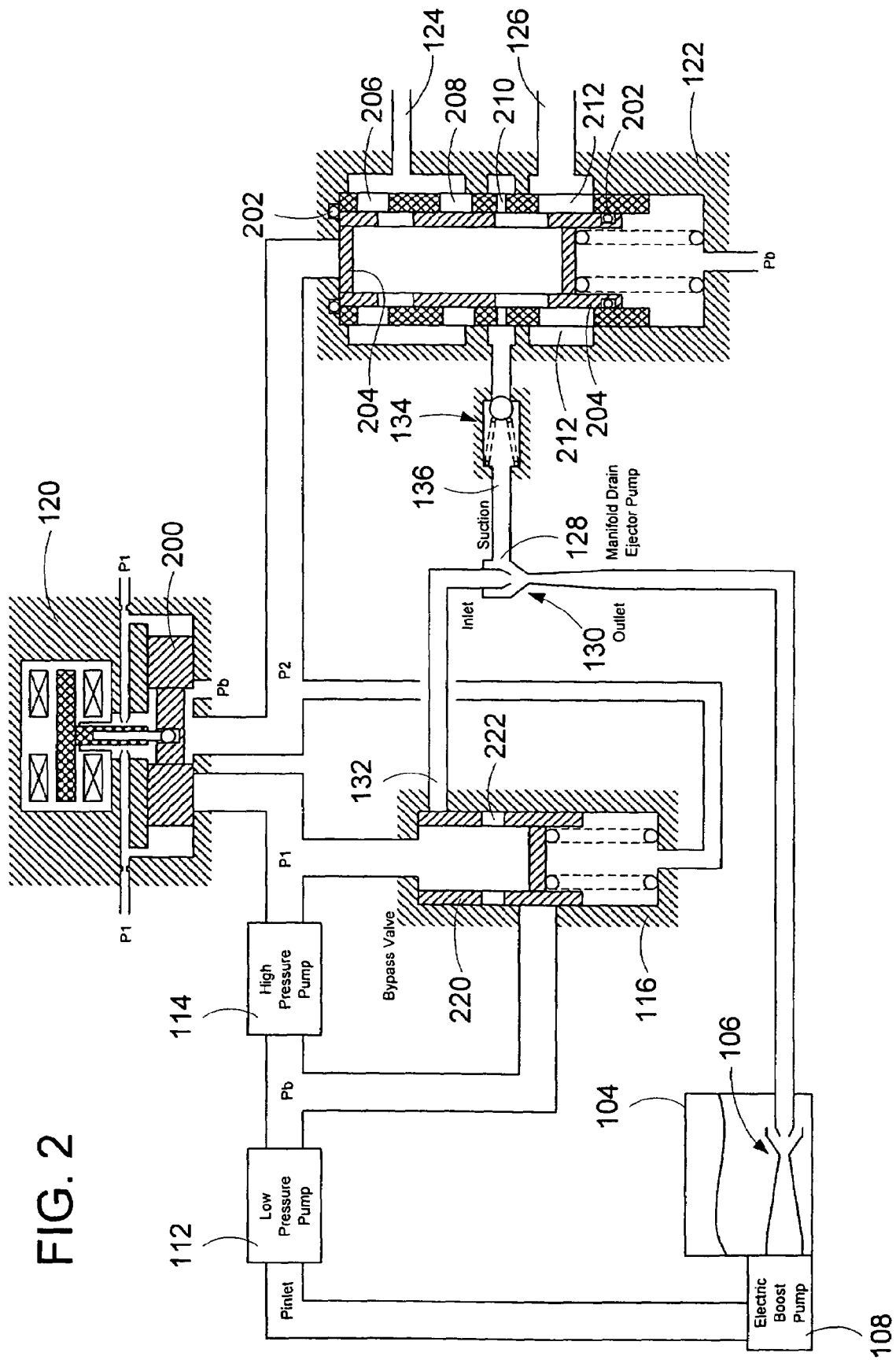
FIG. 2 is a block diagram illustrating the fuel system of the present invention in an aircraft system with the engine shut down.

Note that a separate electrically operated shutoff valve, which is often a solenoid valve, is not used in the present invention. The fuel metering valve 120 provides the shutoff function by moving the metering valve spool 200 to block pump flow and connecting the P2 passage to Pb pressure (see FIG. 2). Since Pb pressure is then on both sides of the pressurizing and shutoff valve 122, the spring of the valve 122 will close the valve 122. Two seals 202 on the shutoff valve 122 plus the zero leak checkvalve 134 prevent leakage into the fuel manifolds. When the metering valve is closed the bypass valve 116 returns all pump flow to the high pressure pump inlet while maintaining P1-Pb at a pressure level set by the force of the bypass valve spring.

Figure 3:
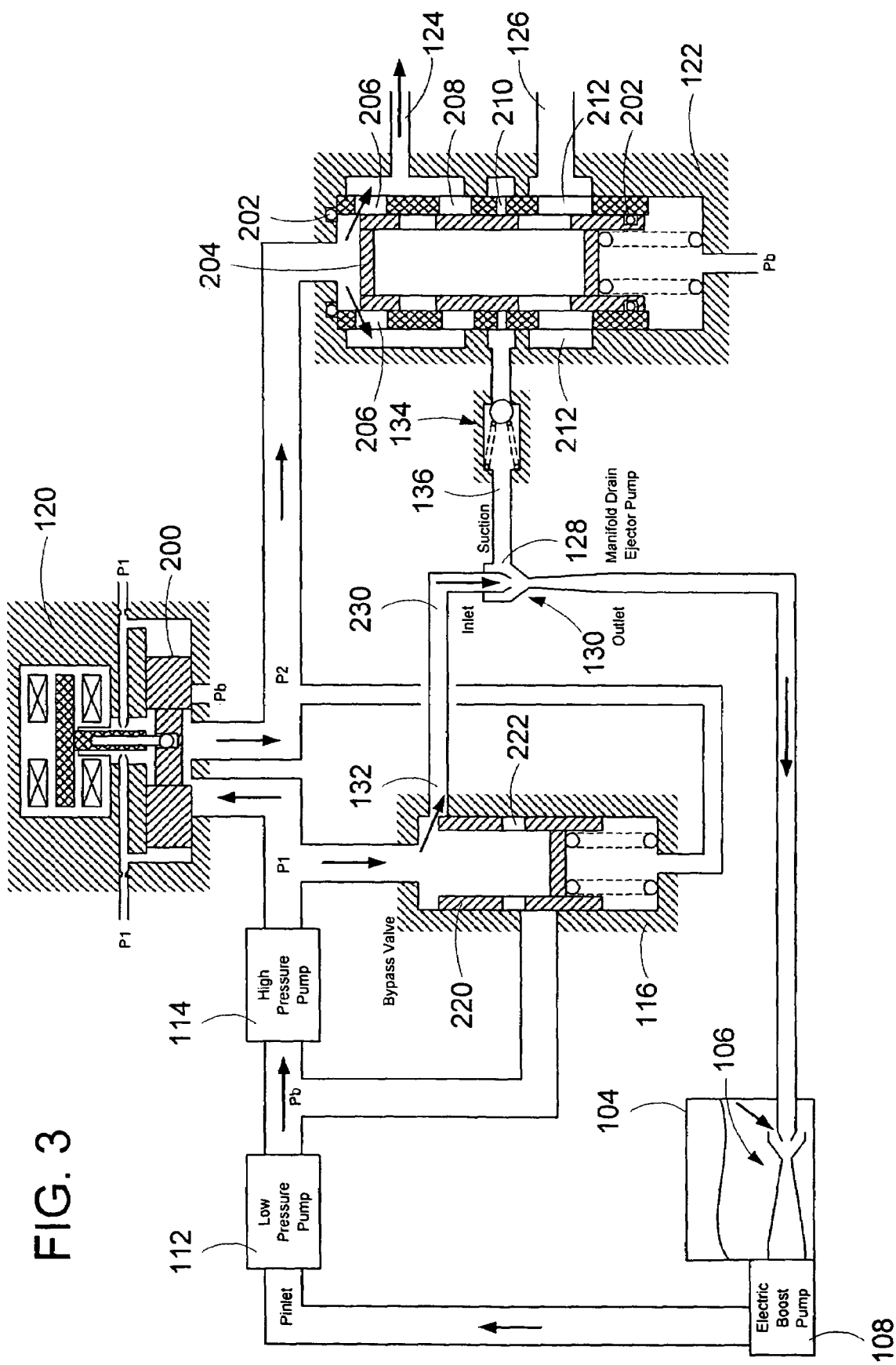
FIG. 3 is a block diagram illustrating the fuel system of the present invention in the aircraft system of FIG. 2 during an engine start condition with fuel flowing in one fuel manifold.
Figure 4:
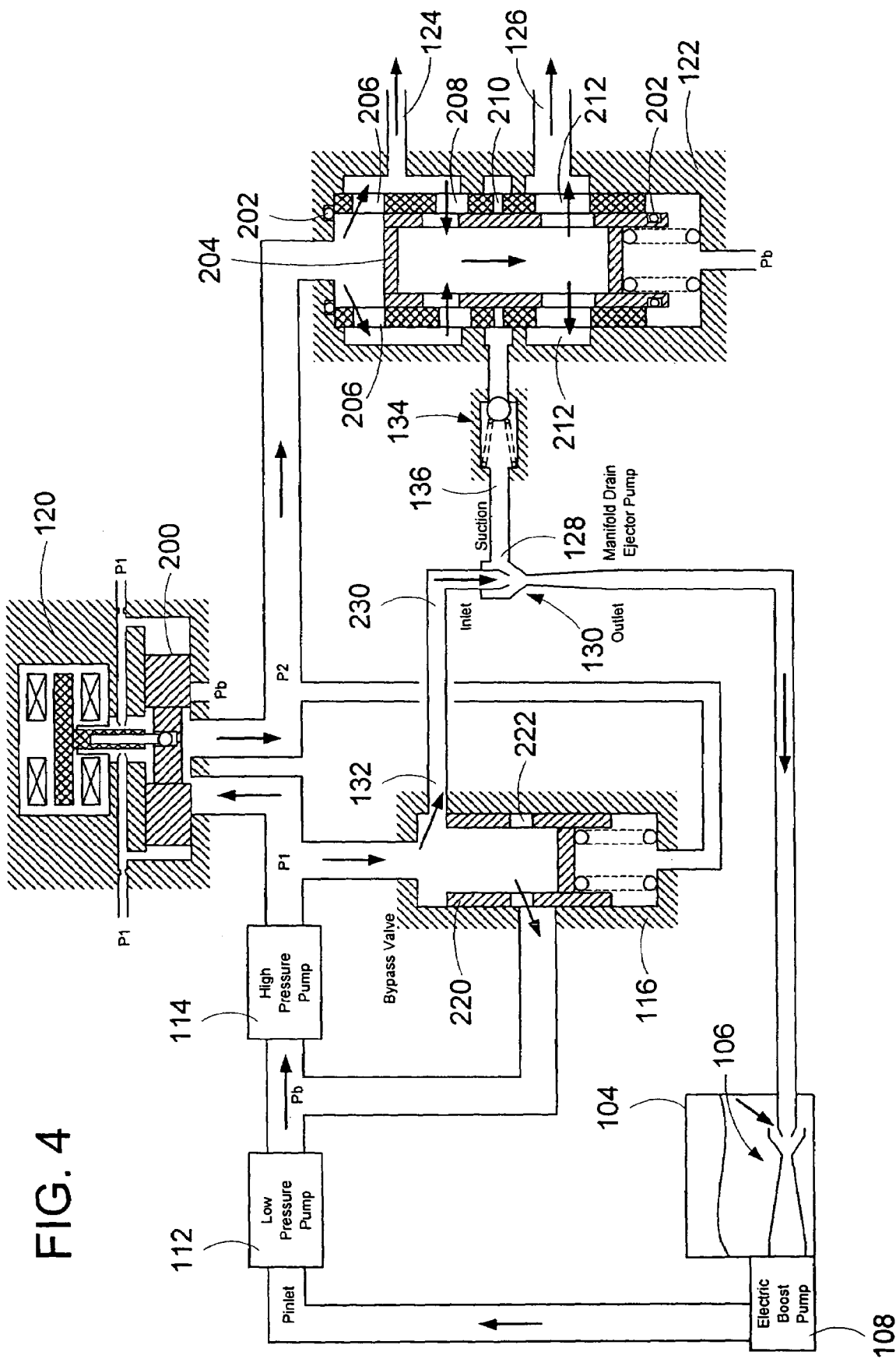
FIG. 4 is a block diagram illustrating the fuel system of the present invention in the aircraft system of FIG. 2 during an engine running condition with fuel flowing in both fuel manifolds.
Figure 5:
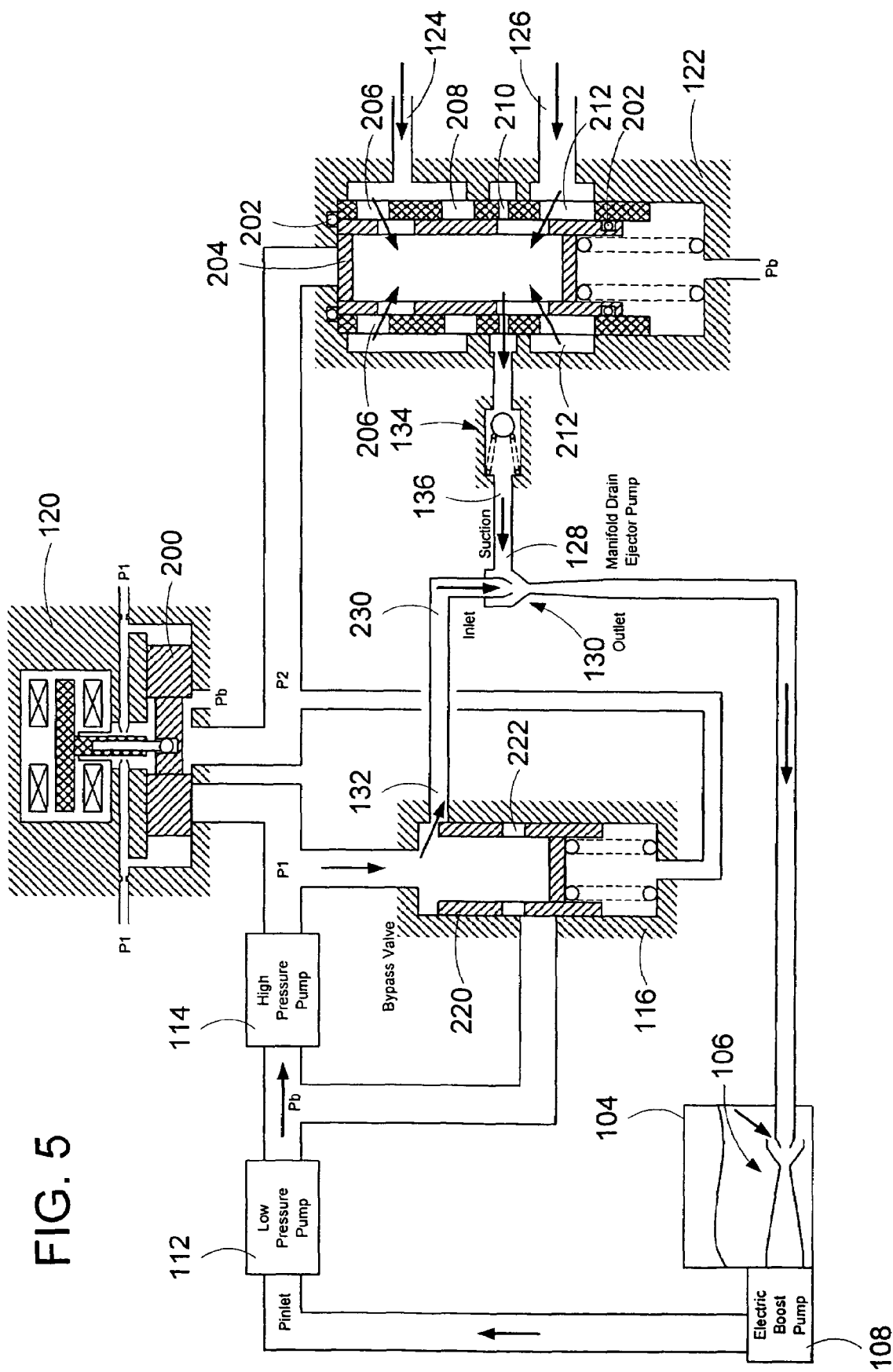
FIG. 5 is a block diagram illustrating the fuel system of the present invention in the aircraft system of FIG. 2 during an engine shut down condition when fuel is being suctioned from the fuel manifolds.

In the description that follows the arrows in FIGS. 3 to 5 indicate the direction of fuel flow and where fuel is flowing. Turning now to FIG. 3, the engine starter accelerates the engine to 5-10% of maximum speed at which time the electronic engine control 118 commands the EHSV 120 to a start flow position. P1 and P2 pressure will increase to overcome the spring force of the pressurizing valve 122 and spool 204 will move and partially open port 206. Flow will be provided initially to manifold 124. The bypass valve spool 220 moves, resulting in bypass valve 116 to open to spill excess pump flow. At first the excess flow will be sent to the fuel tank ejector pump 106 through the motive flow line 230. This motive flow helps pump fuel from the fuel tank 104 to the engine low pressure pump 112. The suction port 210 in the pressurizing/shutoff/flow divider/manifold drain valve 122 remains blocked and there is no flow in the suction line 136. The port 208 that supplies metered flow to manifold 126 is also blocked.

As the engine speed increases, the high pressure pump flow increases. Turning now to FIG. 4, the pump flow opens the bypass valve further resulting in port 222 being open to the high pressure pump inlet and the flow also spills back to the high pressure pump inlet. The fuel metering valve P1-P2 pressure drop is maintained by the bypass valve 116. The electronic engine control 118 opens the fuel metering valve port further and fuel flow increases. The increased flow moves spool 204 of valve 122 further, which opens ports 208 and 212 to fuel flow, thereby providing fuel to manifold 126. The manifold drain ejector suction port 210 remains blocked by the spool 204.

Turning now to FIG. 5, during shutdown, the electronic engine control 118 commands the EHSV 120 to close the metering valve 120 and switch P2 pressure to Pb (i.e., boost pressure). This results in the pressurizing/shutoff/flow divider/manifold drain valve closing and connecting both manifolds to the suction line 136 of the manifold drain ejector pump via port 210. The fuel in the manifolds is then suctioned back to the fuel tank 104. As engine speed decreases (and high pressure pump flow decreases), the bypass valve 116 will gradually move to close port 132 and the pressure in line 230 will drop and the pressure in suction line 136 will increase. The spring in the inlet check valve will then move the checkvalve closed, thereby blocking the flow from line 136.

The amount of fuel (and gas) pulled from the manifold can be controlled by the port size in the pressurizing/shutoff/flow divider/manifold drain valve 122. A smaller diameter hole will reduce the amount of flow and prevent hot gases and contamination from entering the pressurizing/shutoff/flow divider/manifold drain valve 122. At low engine RPM, the checkvalve 134 will close and prevent leakage from the fuel tank back into the manifolds. Two seals 202 on the pressurizing/shutoff/flow divider/manifold drain valve also prevent fuel leakage from the fuel tank into the manifolds.

While the check valve 134 and ejector pump 130 have been shown separately for purposes of illustration, the check valve 134 and ejector pump 130 are combined in another embodiment. Turning now to FIGS. 6 to 10, operational views are shown of a combined check valve/ejector pump 300. The ejector 300 has inlet port 302, outlet port 304, and suction port 306. Inlet port 302 and suction port 306 are formed into housing 308.

The ejector pump is formed by inlet port 302, tapered passage 310, diffuser 312, and outlet port 304. Ejector piston 314 fits within a bore 316. The ejector piston 314 may have an insert (not shown) that forms the tapered passage (or nozzle) 310. The nozzle 310 increases the velocity of fuel flowing through it so as to create suction at the port 306. The ejector piston 314 is movable and is moved by the pressure forces exerted by Pinlet, Psuction, and Poutlet. The ejector piston 314 is spring-loaded to a default position by spring 318. The ejector piston 314 has radial ports 320 around the circumference of the ejector piston 314. The radial ports 320 are used for the checkvalve function as described herein below. Psuction pressure is communicated to chamber 324 via passage 322. Seals 326, 328, 330 seal ejector piston 314.

Figure 6A:
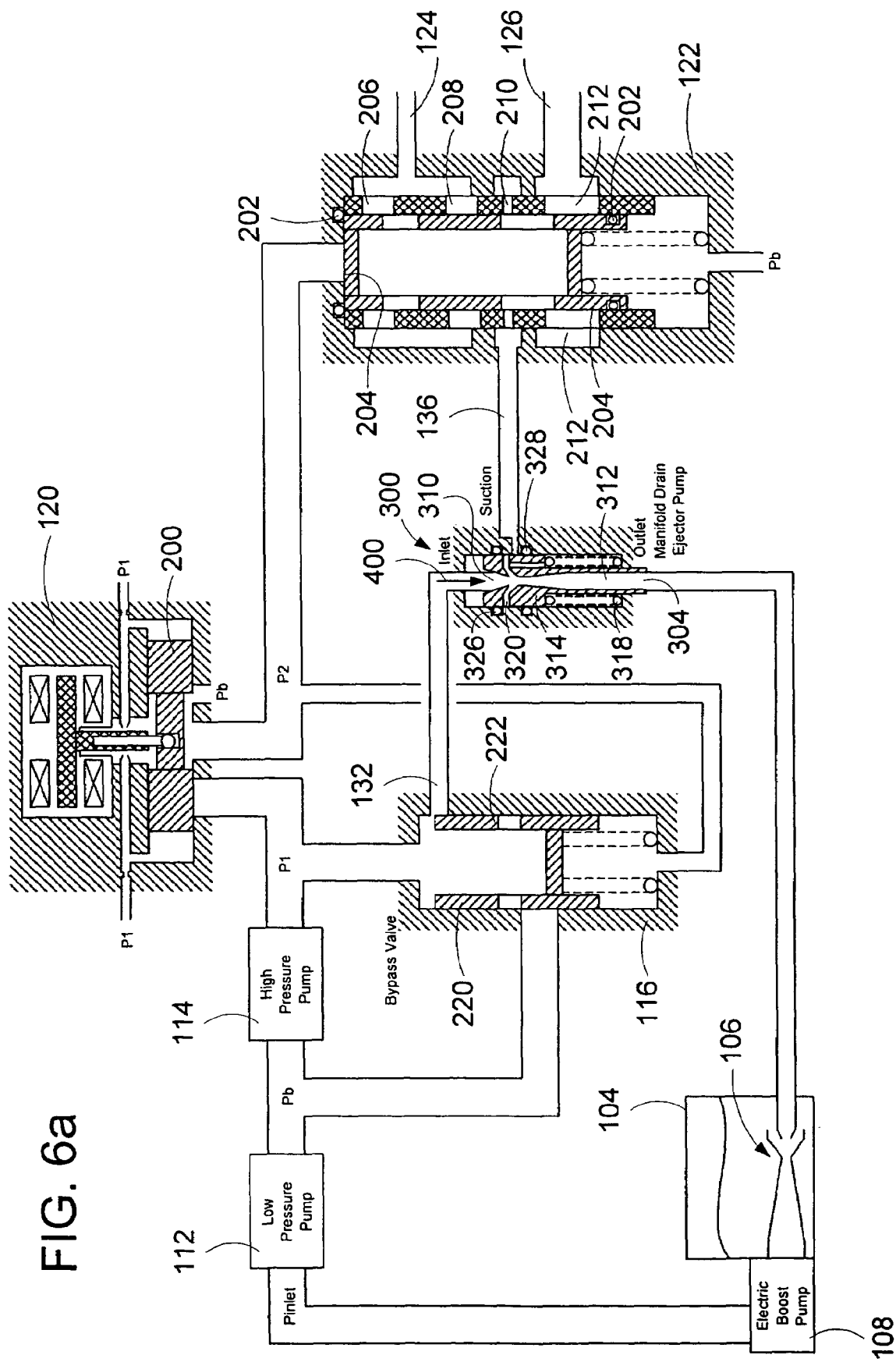
FIG. 6a is a block diagram illustrating the combined check valve/ejector pump in a fuel system of the present invention.

Now that the components of the pump/valve 300 have been described, the operation of the pump/valve 300 will now be described. In the description that follows, arrows will be used to indicate the direction of fuel flow. Turning now to FIGS. 6a and 6b, the pump/valve 300 is shown with fuel flowing at a low pressure, such as during engine starting. Fuel flows into inlet port 302, through passage 310 and diffuser 312 and exits through outlet port 304 as indicated by arrow 400. As engine flow and pump flow increases, the pressure force balance changes on the ejector piston 314 and the ejector piston 314 moves to compress spring 318. Any fuel or air in the spring compartment 324 is vented into the flow passage. As the fuel pressure rises, radial ports 320 approaches port 306.

Figure 7A:
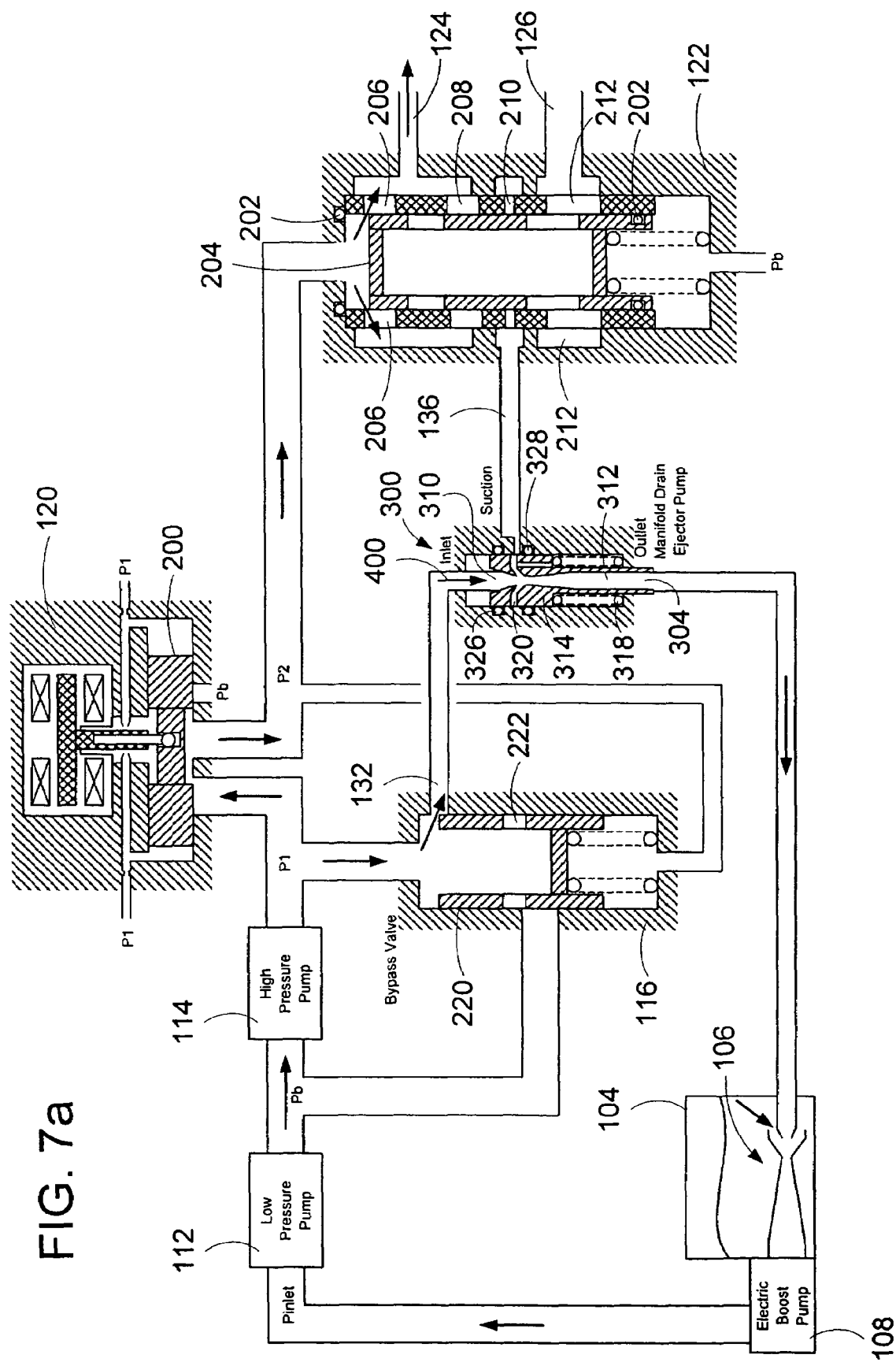
FIG. 7a is a block diagram illustrating the combined check valve/ejector pump of FIG. 6a during an engine start condition with fuel flowing in one fuel manifold.
Figure 8A:
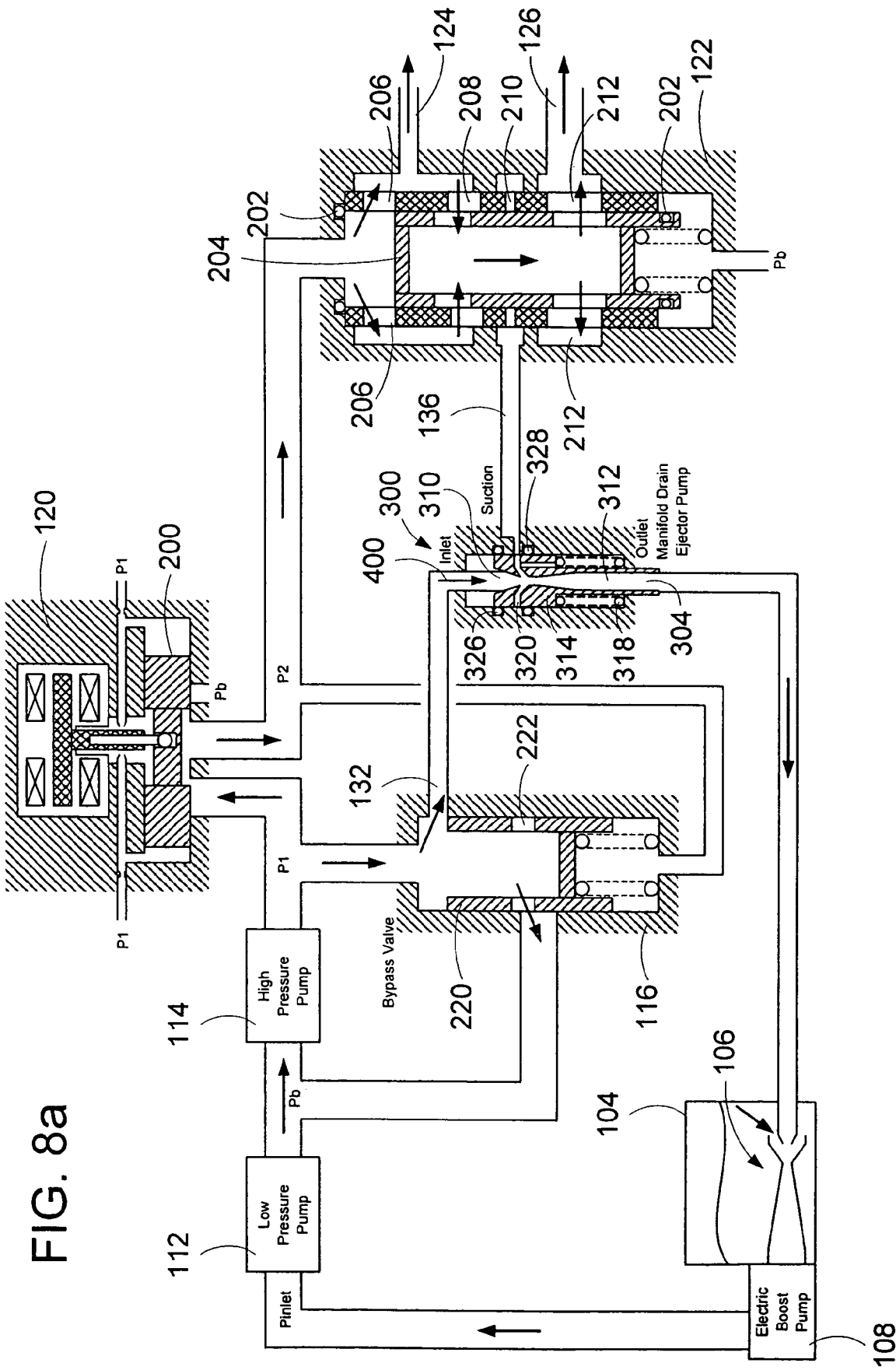
FIG. 8a is a block diagram illustrating the combined check valve/ejector pump of FIG. 6a during an engine running condition with fuel flowing in both fuel manifolds.
Figure 8B:
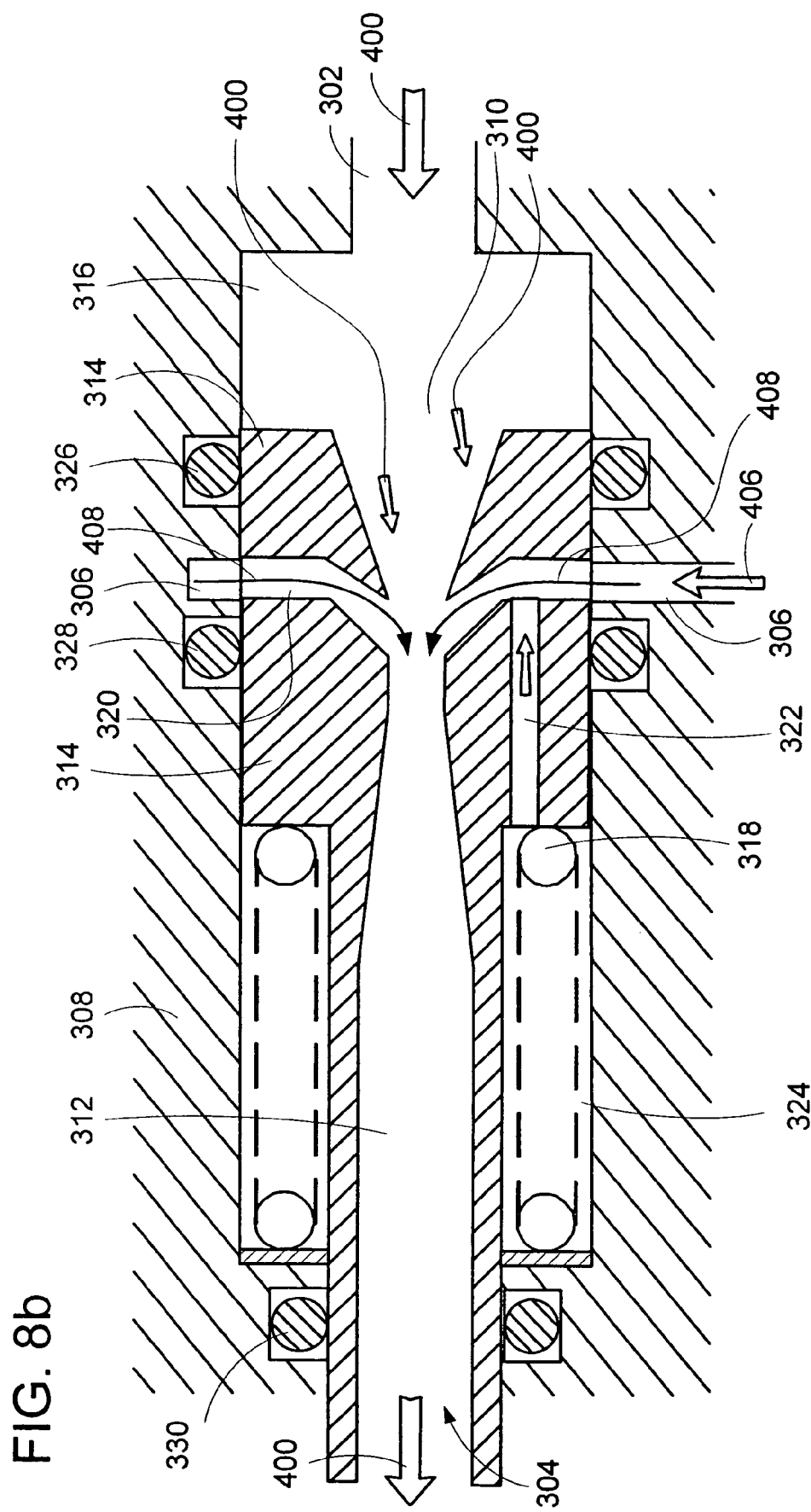

Turning now to FIGS. 7a and 7b, when the radial ports 320 are at the edge of port 306, any fuel in the line connecting port 306 to the pressurizing/shutoff/flow divider/manifold drain valve 122 is suctioned into nozzle 310 (arrows 406, 408) and through the outlet port 304. As the fuel pressure increases further, the ejector piston 314 reaches a stop where the radial ports 320 are aligned with port 306 (see FIGS. 8a and 8b). When there is fuel flow to the engine, there will be no flow from the pressurizing and shutoff valve 122 in the suction line because port 210 of the pressurizing/shutoff/flow divider/manifold drain valve 122 is closed.

Figure 9A:
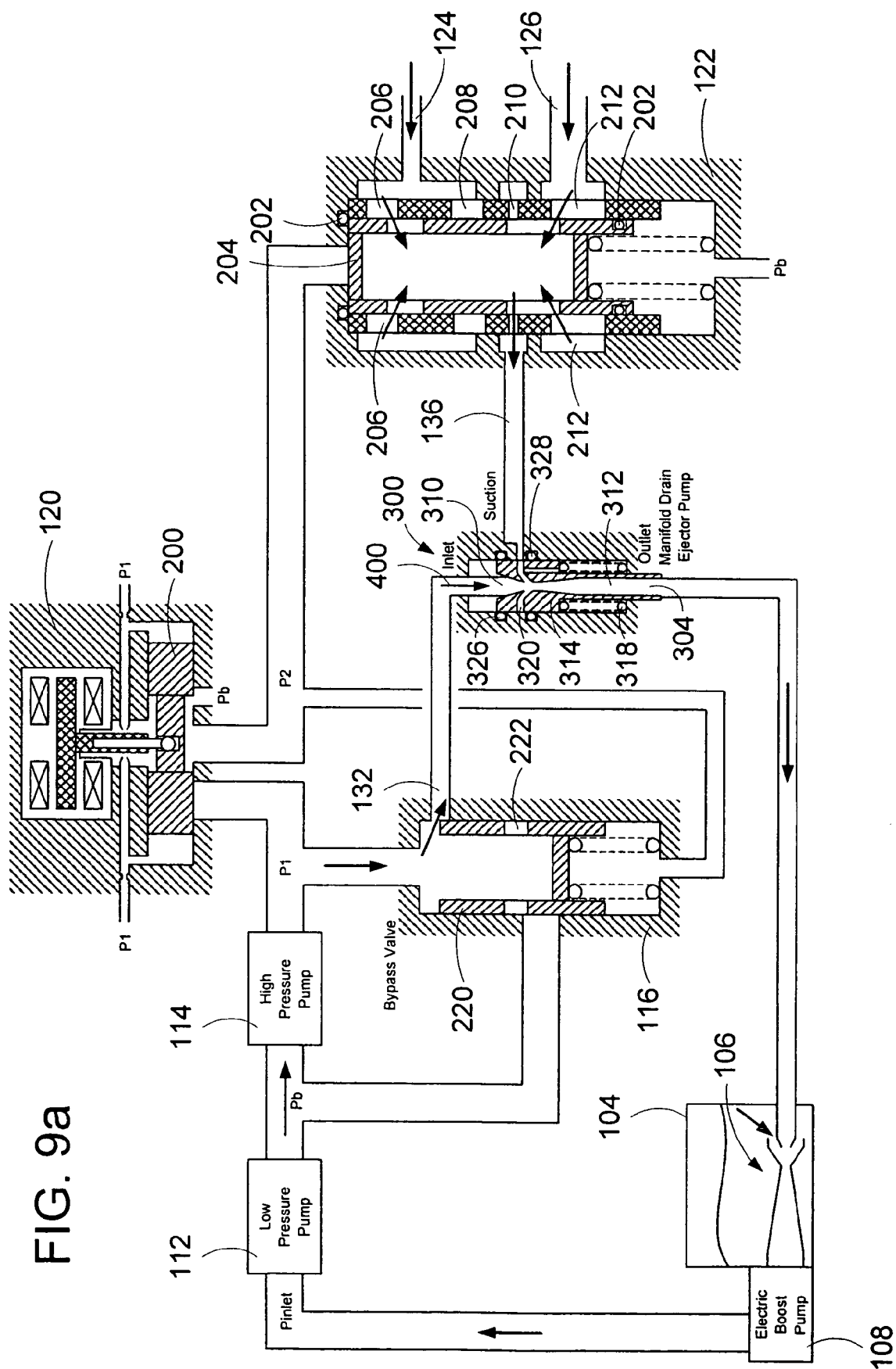
FIG. 9a is a block diagram illustrating the combined check valve/ejector pump of FIG. 6a during an engine shut down condition when fuel is being suctioned from the fuel manifolds.
Figure 9B:
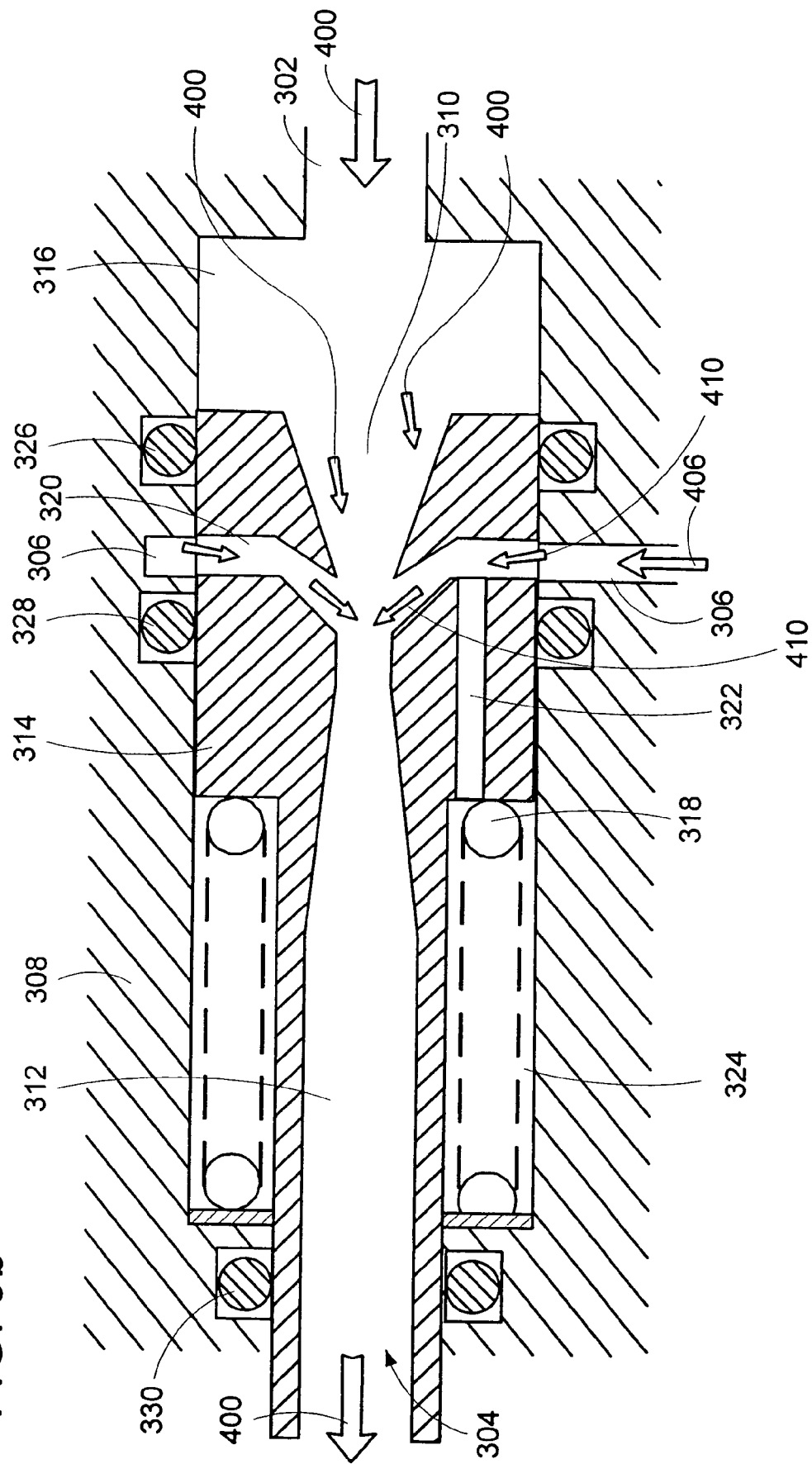
Figure 10A:
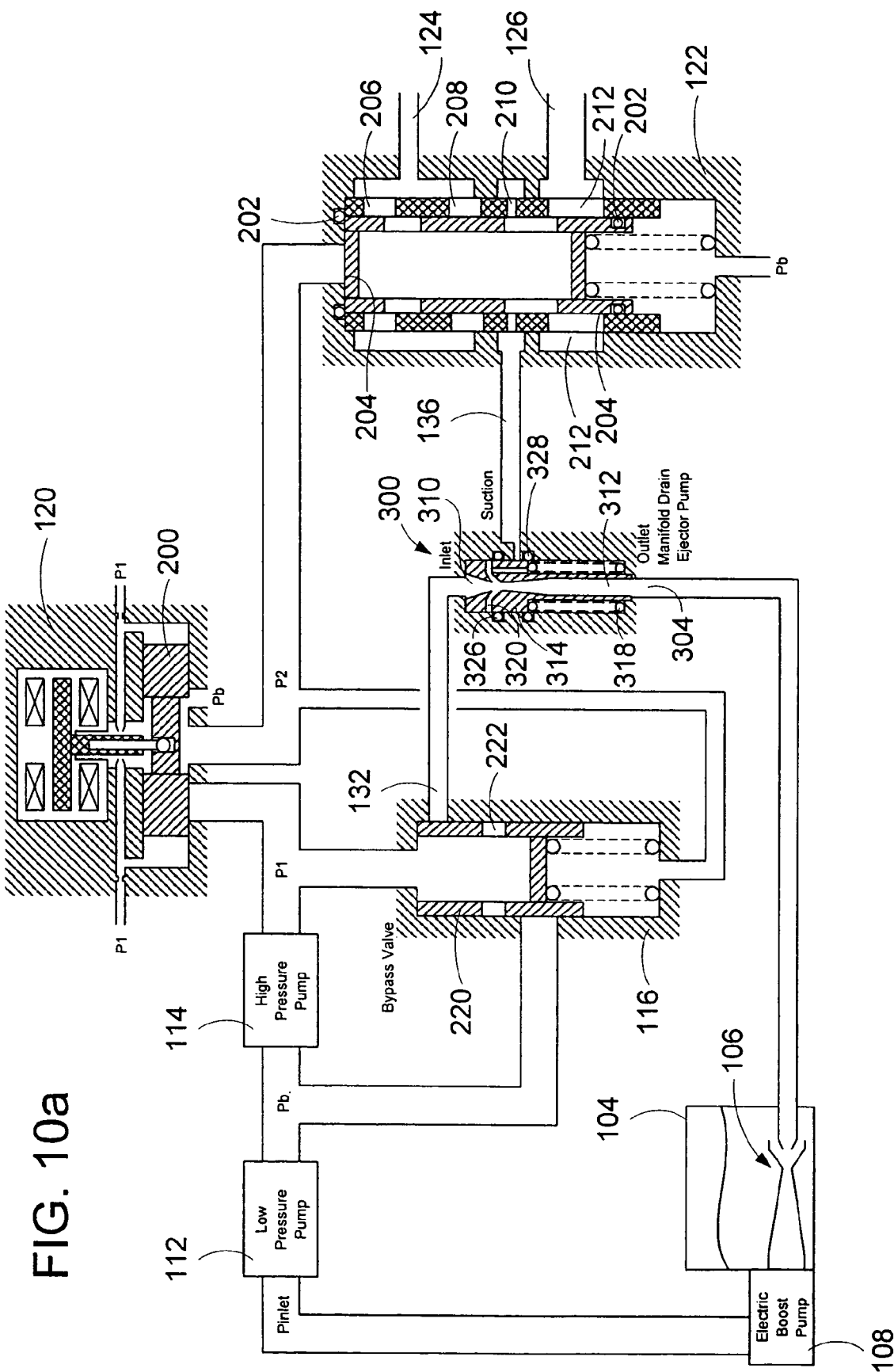
FIG. 10a is a block diagram illustrating the combined check valve/ejector pump of FIG. 6a in a closed position.
Figure 10B:
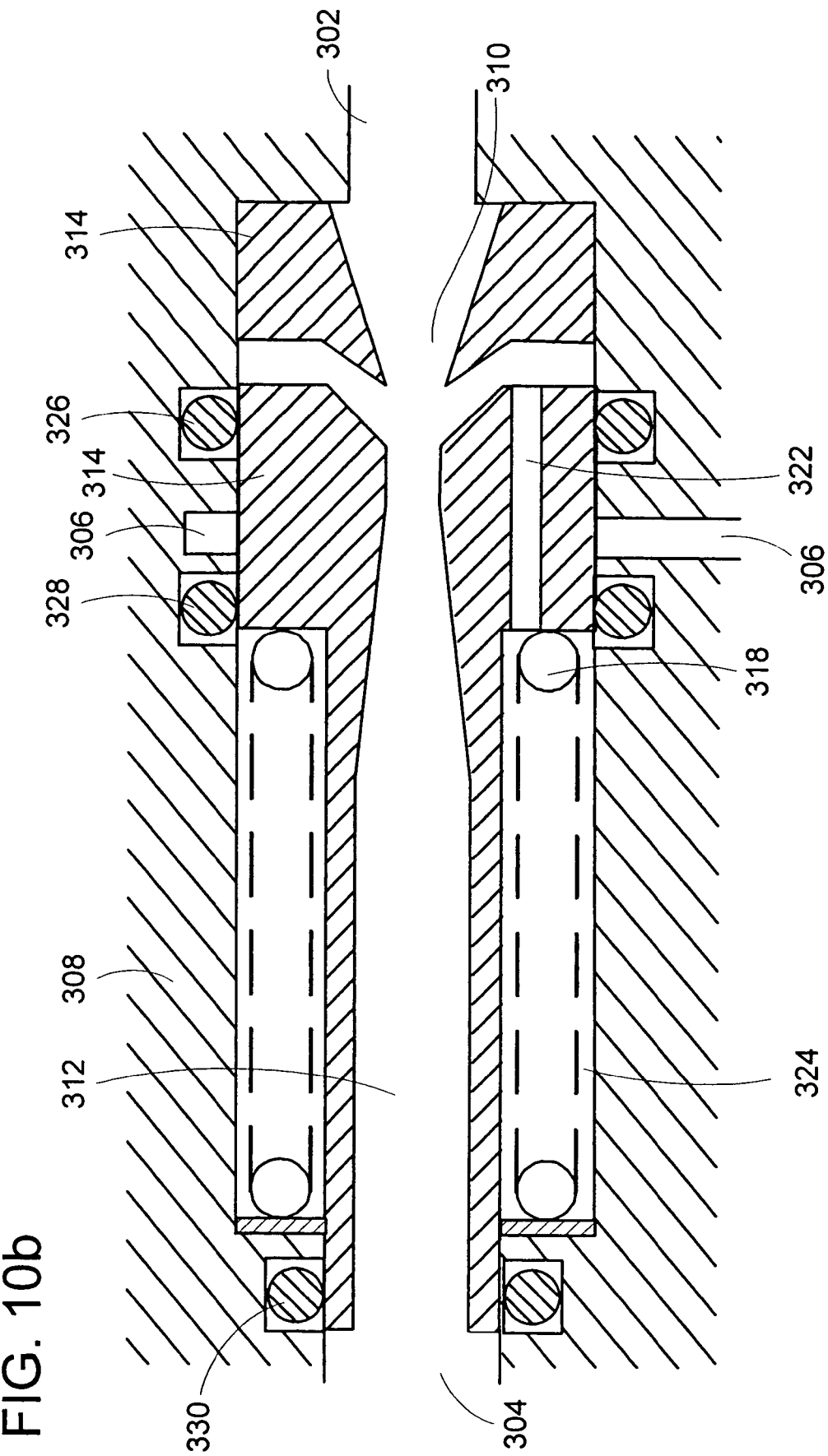

At engine shutdown, the pressurizing and shutoff valve 122 moves to the shutoff position shown in FIG. 9a and port 210 is open. Fuel from the manifolds 124, 126 is drawn into the suction line 136 through radial ports 320 (arrows 406, 410, see FIG. 9b) and through the outlet port 304. As the ejector piston 314 moves towards its closed position, fuel in bore 322 displaced by movement of ejector piston 314 flows to the outlet port. Turning now to FIGS. 10a and 10b, as the bypass valve 116 nears its closed position, flow through the inlet of the ejector pump 300 decreases and the pressure force balance changes on the ejector piston 314. Valve spool 220 will close port 132. This results in the ejector piston 314 moving to its default position and the radial ports 320 move away from port 306. Flow through suction line 136 stops and seals 326, 328 prevent flow from leaking into the manifolds 124, 126.

It can therefore be seen from the foregoing that a system for automatically transferring the fuel from one or more engine fuel manifolds directly to the engine fuel tank(s) during engine shutdown using an ejector pump has been described. In addition to the fuel ejector, only one simple, inexpensive checkvalve is used. The checkvalve may be integrated with the ejector pump. As has been described, "motive flow" is used for the ejector pump inlet flow. A metering valve initiates fuel flow shutoff and draining of the fuel manifolds, thereby eliminating the need for an additional solenoid dedicated mainly to the shutoff function. The shutoff and pressurizing valve also provides flow division between manifolds and manifold drain for systems having multiple manifolds. The time to drain the manifold(s) upon engine shutdown can be adjusted to prevent hot gases and contamination from entering the fuel control unit. Additionally, the bypass valve is used to turn the motive flow and/or manifold drain functions on and off as a function of engine speed at start and shutdown.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ejector pump comprising:
   a housing having a bore along a first axis and a first radial passage from an outer surface of the housing to the bore defining a suction port, the bore defining an inlet port at a first end of the housing;
   an ejector piston mounted within the bore, the ejector piston having at least one second radial passage along a second axis from an outer surface of the ejector piston to a nozzle extending from a first opening to a second opening of the ejector piston; and
   wherein the ejector piston moves along the first axis as a function of the pressure of the medium flowing through the nozzle such that the at least one second radial passage provides a flow path from the suction port to the nozzle and does not provide a flow path outside a pressure range.

2. The ejector pump of claim 1 further comprising a plurality of seals located in recesses on the bore.

3. The ejector pump of claim 2 wherein the first radial passage is located between at least two of the plurality of seals.

4. The ejector pump of claim 1 further comprising spring means to spring load the ejector piston to a default position.

5. The ejector pump of claim 4 wherein the spring means comprises at least one spring.

6. The ejector pump of claim 1 wherein the nozzle has a tapered passage at the first opening.

7. The ejector pump of claim 6 wherein the nozzle has a diffuser at the second opening.

8. The ejector pump of claim 6 wherein during operation, flow pressure against the tapered passage causes the ejector piston to move.

9. The ejector pump of claim 1 wherein the nozzle increases fuel velocity flowing through the nozzle such that suction is created at the at least one second radial passage.

10. The ejector pump of claim 1 wherein the nozzle has a diffuser at the second opening.

11. The ejector pump of claim 1 wherein the ejector piston is spring-loaded to a default position such that the ejector pump prevents flow from leaking into a manifold.

12. An ejector pump comprising:
    a housing having a bore along a first axis and a first radial passage from an outer surface of the housing to the bore defining a suction port, the bore defining an inlet port at a first end of the housing;
    an ejector piston mounted within the bore, the ejector piston having at least one second radial passage along a second axis from an outer surface of the ejector piston to a nozzle extending from a first opening to a second opening of the ejector piston;
    wherein the ejector piston is spring-loaded to a default position such that the ejector pump prevents flow from leaking into a manifold; and
    wherein the default position is a position where the second radial passage is not in fluid communication with the first radial passage.

13. The ejector pump of claim 1 wherein motive flow is used to provide flow through the nozzle.

14. An ejector pump comprising:
    a housing having a bore along a first axis and a first radial passage from an outer surface of the housing to the bore defining a suction port, the bore defining an inlet port at a first end of the housing;
    an ejector piston mounted within the bore, the ejector piston having at least one second radial passage along a second axis from an outer surface of the ejector piston to a nozzle extending from a first opening to a second opening of the ejector piston; and
    wherein an opening and closing of fluid communication between the first radial passage and the second radial passage is a function of fuel pressure.

15. An ejector pump comprising:
    a housing having a bore along a first axis and a first radial passage from an outer surface of the housing to the bore defining a suction port, the bore defining an inlet port at a first end of the housing;
    an ejector piston mounted within the bore, the ejector piston having at least one second radial passage along a second axis from an outer surface of the ejector piston to a nozzle extending from a first opening to a second opening of the ejector piston;
    spring means to spring load the ejector piston to a default position; and
    wherein the ejector piston moves along the first axis as a function of the pressure of the medium flowing through the nozzle such that the at least one second radial passage provides a flow path from the suction port to the nozzle and does not provide a flow path outside a predetermined pressure range.

16. The ejector pump of claim 15 wherein the nozzle has a tapered passage at the first opening.

17. The ejector pump of claim 15 further comprising a plurality of seals located in recesses on the bore.

18. The ejector pump of claim 17 wherein the first radial passage is located between at least two of the plurality of seals.

* * * * *